(12) United States Patent
Duque de Souza

(10) Patent No.: US 10,192,242 B1
(45) Date of Patent: Jan. 29, 2019

(54) BOOSTING AD PERFORMANCE BY IDENTIFYING HOTSPOTS

(71) Applicant: Facebook, Inc., Menlo Park, CA (US)

(72) Inventor: Artur Duque de Souza, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/783,323

(22) Filed: Oct. 13, 2017

(51) Int. Cl.
| | |
|---|---|
| *H04W 24/08* | (2009.01) |
| *G06Q 30/02* | (2012.01) |
| *H04W 4/021* | (2018.01) |
| *H04W 4/02* | (2018.01) |
| *H04L 29/08* | (2006.01) |
| *G06Q 50/00* | (2012.01) |
| *H04W 4/21* | (2018.01) |

(52) U.S. Cl.
CPC ..... *G06Q 30/0266* (2013.01); *G06Q 30/0205* (2013.01); *G06Q 30/0267* (2013.01); *G06Q 50/01* (2013.01); *H04L 67/20* (2013.01); *H04L 67/22* (2013.01); *H04W 4/022* (2013.01); *H04W 4/027* (2013.01); *H04W 4/21* (2018.02); *H04W 24/08* (2013.01); *G06Q 30/0275* (2013.01)

(58) Field of Classification Search
CPC ..... H04W 84/12; H04W 36/22; H04W 48/16; H04W 48/20; H04W 88/08; H04W 28/0284; H04W 36/08; H04W 24/02; H04W 28/08; H04W 28/0289; H04W 72/0446; H04W 84/045; H04W 52/0206; H04W 72/0486
See application file for complete search history.

(56) References Cited

U.S. PATENT DOCUMENTS

| | | | |
|---|---|---|---|
| 2015/0120455 A1* | 4/2015 | McDevitt | G06Q 30/0261 705/14.58 |
| 2016/0373963 A1* | 12/2016 | Chechani | H04W 28/08 |

* cited by examiner

*Primary Examiner* — Kwasi Karikari
(74) *Attorney, Agent, or Firm* — Baker Botts L.L.P.

(57) ABSTRACT

In one embodiment, a method includes receiving a message comprising status data from a second computing device, determining that a geographic area is a hotspot based at least on the status data, where mobile users in a hotspot have a high probability of accessing an application on their mobile computing devices, and sending an indication that the geographic area is a hotspot to a third-party computing device, where the indication is used by the third-party computing device to determine a value for delivery of content to computing devices associated with the geographic area.

19 Claims, 7 Drawing Sheets

US 10,192,242 B1

BOOSTING AD PERFORMANCE BY IDENTIFYING HOTSPOTS

TECHNICAL FIELD

This disclosure generally relates to providing value-added information to content providers based on data analysis.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, the social-networking system may determine that a small geographic region is undergoing a particular condition such that users in that region may have higher probability of engaging with social-networking applications on their mobile computing devices, where such a geographic region is referred to as a hotspot. The social-networking system may notify one or more content providers having relevant content for the users in the hotspot about the determined hotspot. The content providers may consider the fact that a geographic area is a hotspot when the content provider determines values of content delivery to the geographic area. As an example and not by way of limitations, the social-networking system may determine that a particular region of a city is experiencing a significant traffic congestion based on traffic information from a third-party traffic data provider. Because passengers do not have many options for entertainment while experiencing the traffic congestion, the passengers may have a high probability of engaging with social-networking applications on their mobile computing devices. The social-networking system may notify one or more advertisers that the particular region is a hot spot. The one or more advertisers may place higher bids on a geo-targeting ad auction than usual for users in the particular region based on the hotspot information from the social-networking system. A geo-targeting ad auction may allow an advertiser to target one or more advertisements to be delivered to users in a particular region. After the social-networking system determines that a geographic area is a hotspot, the social-networking system may want to verify whether the hotspot determination is correct. In order to verify the determination, the social-networking system may receive a message comprising data from a mobile computing device in the geographic area. The social-networking system may store the received data in a database. The social-networking system may verify the determination that the geographic area is a hotspot based on aggregated data from the database. As an example and not by way of limitations, the social-networking system may receive a message comprising a Click-through Rate (CTR) from a mobile computing device in a geographic area that the social-networking system have determined to be a hotspot. The social-networking system may store the received CTR into a database. The social-networking system may verify the determination that the geographic area is a hotspot based on an average CTR on mobile computing devices in the geographic area. As another example and not by way of limitations, the social-networking system may receive a message comprising a percentage of time spent on video from a mobile computing device in the geographic area. The social-networking system may store the received percentage of time spent on video into the database. The social-networking system may verify the determination that the geographic area is a hotspot based on an average percentage of time spent on video on mobile computing devices in the geographic area.

The social-networking system may receive a message comprising status data from a computing device. In particular embodiments, the computing device may be associated with a third-party data provider. The social-networking system may determine that a geographic area is a hotspot based at least on the status data received from the computing device. Mobile users in a hotspot may have a high probability of accessing an application on their mobile computing devices. In particular embodiments, the status data may comprise traffic data. The social-networking system may determine that the geographic area is a hotspot if the traffic data indicates that traffic congestion in the geographic area is higher than a threshold. In particular embodiments, the status data may comprise event data. The social-networking system may determine that the geographic area is a hotspot if the event data indicates that a mass-gathering event is taking place or will soon take place in the geographic area and a current status of circumstances relating to the event requires that participants in the mass-gathering event wait for a period of time that is longer than a threshold. In particular embodiments, the status data may comprise waiting queue data. The social-networking system may determine that the geographic area is a hotspot if the waiting queue data indicates that at least one waiting queue exists in the geographic area and a number of waiting persons in the at least one waiting queue exceeds a threshold. In particular embodiments, the computing device may be a mobile computing device associated with a first user. The status data may comprise a geographic location of the mobile computing device, a speed of the mobile computing device, and an indication whether the mobile computing device is currently being used by the first user. On receiving status data from a mobile computing device, the social-networking system may add the received status data into a first database. The social-networking system may determine, based on gathered data in the first database, that the geographic area is a hotspot if a number of mobile computing devices satisfying one or all of the following conditions exceeds a threshold: (1) the mobile computing devices are located in the geographic area, (2) the mobile computing devices are moving more slowly than a threshold speed, and (3) the mobile computing devices are currently being used by the associated users. In particular embodiments, the social-networking system may determine that a geographic area is a hotspot further based on history status data on the geographic area. The history status data may comprise status data per season, month, date, day, or time. When the social-networking system determines that a geographic area is a hotspot, the social-networking system may send an indication that the geographic area is a hotspot to a third-party computing device. The third-party computing device may determine a value for delivery of content to computing devices associated with the geographic area based on the indication.

In particular embodiments, the social-networking system may validate the determination that the geographic area is a hotspot. If the validation fails, the social-networking system may send an indication that the geographic area is not a hotspot to the third-party computing device. The social-networking system may receive a measurement report from a mobile computing device in the geographic area. The measurement report may comprise a measured Click-Through Rate (CTR). The social-networking system may add the received measured CTR into a second database. The social-networking system may calculate an average CTR for mobile computing devices in the geographic area based on aggregated data from the second database. The social-networking system may validate the determination that the geographic area is a hotspot if the average CTR is higher than a threshold. In particular embodiments, the measurement report from a mobile computing device in the geographic area may comprise a measured percentage of time spent on video. The social-networking system may add the received measured percentage of time spent on video into the second database. The social-networking system may calculate an average percentage of time spent on video for mobile computing devices in the geographic area based on aggregated data from the second database. The social-networking system may validate the determination that the geographic area is a hotspot if the average percentage of time spent on video is higher than a threshold. In particular embodiments, the social-networking system may receive a message comprising status data from a mobile computing device associated with a second user. The status data from the mobile computing device may comprise a geographic location of the mobile computing device, a speed of the mobile computing device, and an indication whether the mobile computing device is currently being used by the second user. The social-networking system may add the received status data into the first database. The social-networking system may validate the determination that the geographic area is a hotspot based on aggregated data in the first database if a number of mobile computing devices satisfying one or all of the following conditions exceeds a threshold: (1) the mobile computing devices are located in the geographic area, (2) the mobile computing devices are moving more slowly than a threshold speed, and (3) the mobile computing devices are currently being used by the associated users.

When sending an indication that the geographic area is a hotspot to one or more third-party computing devices, the social-networking system may select one or more content providers that are relevant to users in the geographic area and send the indication that the geographic area is a hotspot to one or more computing devices associated with the one or more content providers, respectively. In order to select the one or more content providers, the social-networking system may determine estimated demographic distribution of users in the geographic area based at least on the received status data. The social-networking system may identify types of content that have a higher probability of eliciting action from users in the geographic area than other types of content based on the estimated demographic distribution of users. The social-networking system may select one or more content providers that provide the identified types of content. The social-networking system may estimate the demographic distribution of users based on history data. To identify types of content that have a higher probability of eliciting action from users in the geographic area than other types of content based on the estimated demographic distribution of users, the social-networking system may rank the types of content in order of respective probability of eliciting action from users in the geographic area based on the estimated demographic distribution of users. The social-networking system may identify the k highest rank types of content, where k is a pre-determined number. In particular embodiments, the social-networking system may generate a demographic distribution of users in the geographic area based on records from a third database. In order to retrieve the demographic distribution of users in the geographic area from the third database, the social-networking system may receive a message comprising a current geographic location of the mobile computing device from a mobile computing device associated with a user. The social-networking system may store identity information of the user and the current geographic location into the third database. The social-networking system may generate a demographic distribution of users in the geographic area based on records from the third database.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features

DESCRIPTION OF EXAMPLE EMBODIMENTS

Figure 1:
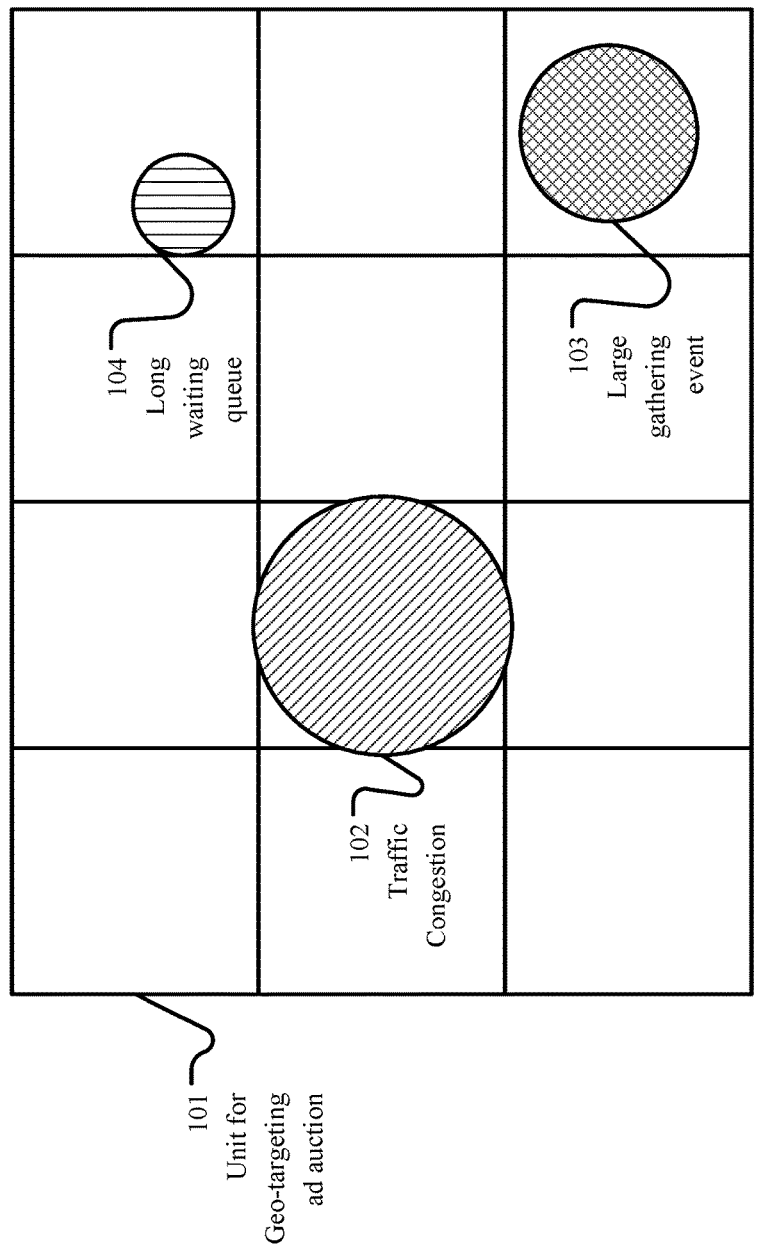
FIG. 1 illustrates example scenarios for potential hotspots.

In particular embodiments, the social-networking system 560 may determine that a small geographic region is undergoing a particular condition such that users in that region may have higher probability of engaging with social-networking applications on their mobile computing devices, where such a geographic region is referred to as a hotspot. The social-networking system 560 may notify one or more content providers having relevant content for the users in the hotspot about the determined hotspot. The content providers may determine a value of content delivery to a geographic area based at least on the fact that the geographic area is a hotspot. As an example and not by way of limitations, the social-networking system 560 may determine that a particular region of a city is experiencing a significant traffic congestion based on traffic information from a third-party traffic data provider. Because passengers do not have many options for entertainment while experiencing the traffic congestion, the passengers may have a high probability of engaging with social-networking applications on their mobile computing devices. The social-networking system 560 may notify one or more advertisers that the particular region is a hotspot. The one or more advertisers may place higher bids on a geo-targeting ad auction than usual for users in the particular region based on the hotspot information from the social-networking system 560. A geo-targeting ad auction may allow an advertiser to target one or more advertisements to be delivered to users in a particular region. In particular embodiments, based on the identification of a hotspot, the social-networking system 560 may establish a minimum price in the geo-targeting ad auction or otherwise modify operation of the the geo-targeting ad auction. After the social-networking system 560 determines that a geographic area is a hotspot, the social-networking system 560 may want to verify whether the hotspot determination is correct. In order to verify the determination, the social-networking system 560 may receive a message comprising data from a mobile computing device in the geographic area. The social-networking system 560 may store the received data in a database. The social-networking system 560 may verify the determination that the geographic area is a hotspot based on aggregated data from the database. As an example and not by way of limitations, the social-networking system 560 may receive a message comprising a Click-through Rate (CTR) from a mobile computing device in a geographic area that the social-networking system 560 have determined to be a hotspot. The social-networking system 560 may store the received CTR into a database. The social-networking system 560 may verify the determination that the geographic area is a hotspot based on an average CTR on mobile computing devices in the geographic area. As another example and not by way of limitations, the social-networking system 560 may receive a message comprising a percentage of time spent on video from a mobile computing device in the geographic area. The social-networking system 560 may store the received percentage of time spent on video into the database. The social-networking system 560 may verify the determination that the geographic area is a hotspot based on an average percentage of time spent on video on mobile computing devices in the geographic area. Although this disclosure describes notifying content providers regarding hotspot information to content providers in a particular manner, this disclosure contemplates notifying content providers regarding hotspot information in any suitable manner.

The social-networking system 560 may receive a message comprising status data from a computing device. In particular embodiments, the computing device may be associated with a third-party data provider. The social-networking system 560 may determine that a geographic area is a hotspot based at least on the status data received from the computing device. Mobile users in a hotspot may have a high probability of accessing an application on their mobile computing devices. In particular embodiments, the status data may comprise traffic data. The social-networking system 560 may determine that the geographic area is a hotspot if the traffic data indicates that traffic congestion in the geographic area is higher than a threshold. In particular embodiments, the status data may comprise event data. The social-networking system 560 may determine that the geographic area is a hotspot if the event data indicates that a mass-gathering event is taking place or will soon take place in the geographic area and a current status of circumstances relating to the event requires that participants in the mass-gathering event wait for a period of time that is longer than a threshold. In particular embodiments, the status data may comprise waiting queue data. The social-networking system 560 may determine that the geographic area is a hotspot if the waiting queue data indicates that at least one waiting queue exists in the geographic area and a number of waiting persons in the at least one waiting queue exceeds a threshold. In particular embodiments, the computing device may be a mobile computing device associated with a first user. The status data may comprise a geographic location of the mobile computing device, a speed of the mobile computing device, and an indication whether the mobile computing device is currently being used by the first user. On receiving status data from a mobile computing device, the social-networking system 560 may add the received status data into a first database. The social-networking system 560 may determine, based on gathered data in the first database, that the geographic area is a hotspot if a number of mobile computing devices satisfying one or all of the following conditions exceeds a threshold: (1) the mobile computing devices are located in the geographic area, (2) the mobile computing devices are moving more slowly than a threshold speed, and (3) the mobile computing devices are currently being used by the associated users. In particular embodiments, the social-networking system 560 may determine that a geographic area is a hotspot further based on history status data on the geographic area. The history status data may comprise status data per season, month, date, day, or time. When the social-networking system 560 determines that a geographic area is a hotspot, the social-networking system 560 may send an indication that the geographic area is a hotspot to a third-party computing device. The third-party computing device may determine a value for delivery of content to computing devices associated with the geographic area based on the indication.

In particular embodiments, the social-networking system 560 may validate the determination that the geographic area is a hotspot. If the validation fails, the social-networking system 560 may send an indication that the geographic area is not a hotspot to the third-party computing device. The social-networking system 560 may receive a measurement report from a mobile computing device in the geographic area. The measurement report may comprise a measured Click-Through Rate (CTR). The social-networking system 560 may add the received measured CTR into a second database. The social-networking system 560 may calculate an average CTR for mobile computing devices in the geographic area based on aggregated data from the second database. The social-networking system 560 may validate the determination that the geographic area is a hotspot if the average CTR is higher than a threshold. In particular embodiments, the measurement report from a mobile computing device in the geographic area may comprise a measured percentage of time spent on video. The social-networking system 560 may add the received measured percentage of time spent on video into the second database. The social-networking system 560 may calculate an average percentage of time spent on video for mobile computing devices in the geographic area based on aggregated data from the second database. The social-networking system 560 may validate the determination that the geographic area is a hotspot if the average percentage of time spent on video is higher than a threshold. In particular embodiments, the social-networking system 560 may receive a message comprising status data from a mobile computing device associated with a second user. The status data from the mobile computing device may comprise a geographic location of the mobile computing device, a speed of the mobile computing device, and an indication whether the mobile computing device is currently being used by the second user. The social-networking system 560 may add the received status data into the first database. The social-networking system 560 may validate the determination that the geographic area is a hotspot based on aggregated data in the first database if a number of mobile computing devices satisfying one or all of the following conditions exceeds a threshold: (1) the mobile computing devices are located in the geographic area, (2) the mobile computing devices are moving more slowly than a threshold speed, and (3) the mobile computing devices are currently being used by the associated users.

When sending an indication that the geographic area is a hotspot to one or more third-party computing devices, the social-networking system 560 may select one or more content providers that are relevant to users in the geographic area and send the indication that the geographic area is a hotspot to one or more computing devices associated with the one or more content providers, respectively. In order to select the one or more content providers, the social-networking system 560 may determine estimated demographic distribution of users in the geographic area based at least on the received status data. The social-networking system 560 may identify types of content that have a higher probability of eliciting action from users in the geographic area than other types of content based on the estimated demographic distribution of users. The social-networking system 560 may select one or more content providers that provide the identified types of content. The social-networking system 560 may estimate the demographic distribution of users based on history data. To identify types of content that have a higher probability of eliciting action from users in the geographic area than other types of content based on the estimated demographic distribution of users, the social-networking system 560 may rank the types of content in order of respective probability of eliciting action from users in the geographic area based on the estimated demographic distribution of users. The social-networking system 560 may identify the k highest rank types of content, where k is a pre-determined number. In particular embodiments, the social-networking system 560 may generate a demographic distribution of users in the geographic area based on records from a third database. In order to retrieve the demographic distribution of users in the geographic area from the third database, the social-networking system 560 may receive a message comprising a current geographic location of the mobile computing device from a mobile computing device associated with a user. The social-networking system 560 may store identity information of the user and the current geographic location into the third database. The social-networking system 560 may generate a demographic distribution of users in the geographic area based on records from the third database.

FIG. 1 illustrates example scenarios for potential hotspots. In a geo-targeting ad auction, advertisers may be able to target one or more advertisements to be delivered to users in a particular region. The particular region may comprise one or more geo-targeting ad auction units 101. A geographic area may be divided into a plurality of geo-targeting ad auction units 101 for a geo-targeting ad auction purpose. When a region comprising one or more geo-targeting ad auction units is experiencing a traffic congestion 102, the region with traffic congestion 102 may be a hotspot in a geo-targeting ad auction because users in the region may not have many other options for entertainment but accessing applications on their mobile computing devices. When a large gathering event 103 is taking place in a region comprising one or more geo-targeting ad auction units, the region may be a hotspot in a geo-targeting ad auction because users attending the large gathering event 103 may check the status of the event and post short messages or pictures using their mobile computing devices on the online social network. If one or more waiting queues 104 exist in a geographic region comprising one or more geo-targeting ad auction units, the region may be a hotspot in a geo-targeting ad auction because users in the one or more waiting queues may not have other option for entertainment but accessing applications on their mobile computing devices. More example scenarios for potential hotspots can be identified where users in a particular region may have a high probability of accessing applications on their mobile computing devices.

Figure 2:
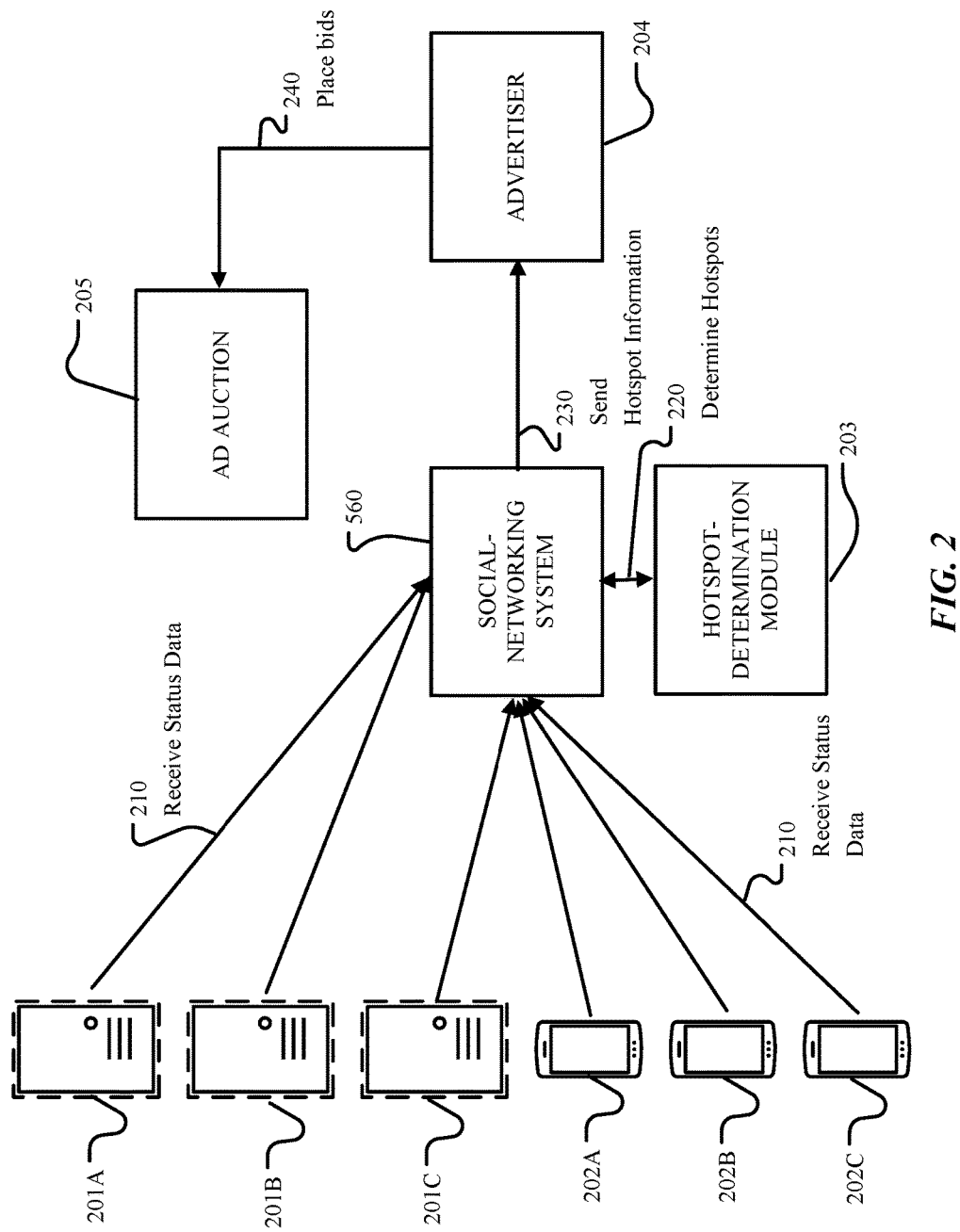
FIG. 2 illustrates example data flows for determining hotspots and utilizing hotspot determinations for a geo-targeting ad auction.

FIG. 2 illustrates example data flows for determining hotspots and utilizing hotspot determinations for a geo-targeting ad auction. In particular embodiments, the social-networking system 560 may receive a message comprising status data from a computing device 201A associated with a third-party data provider at step 210. The status data may be associated with a geographic area. The social-networking system 560 may determine, at step 220 by utilizing a hotspot-determination module 203, that the geographic area is a hotspot based at least on the status data received from the computing device 201A. The hotspot-determination module 203 may be a part of the social-networking system 560. In particular embodiments, the hotspot-determination module 203 may be apart from the social-networking system

560. Users in a hotspot may have a high probability of accessing a social-networking application on their mobile computing devices. Information whether a geographic area is a hotspot may be used by a content provider (e.g., an advertiser 204) when the content provider determines a value for delivery of content to mobile computing devices associated with the geographic area. As an example and not by way of limitations, the social-networking system 560 may receive, at step 210, a message comprising status data from a computing device 201B associated with a third-party data provider. The status data may be about traffic conditions on a particular geographic area. The social-networking system 560 may pass the received status data to a hotspot-determination module 203. The hotspot-determination module 203 may determine if the particular geographic area is a hotspot at least based on the received status data at step 220. The hotspot-determination module 203 may utilize other information including history data or previously received status data for the determination at step 220. Although this disclosure describes determining hotspots based at least on received status data in a particular manner, this disclosure contemplates determining hotspots based at least on received status data in any suitable manner.

In particular embodiments, the social-networking system 560 may receive a message comprising status data from a computing device 201A, where the status data may comprise traffic data of a particular geographic area. The computing device 201A may be associated with a third-party traffic data provider. In particular embodiments, the computing device may be associated with a police department for the particular area. The social-networking system 560 may determine that the geographic area is a hotspot if the traffic data indicates that traffic congestion in the geographic area is more significant than a threshold. As an example and not by way of limitations, the social-networking system 560 may receive, at step 210, a message comprising status data from a computing device 201A associated with a third-party traffic data provider. The status data may comprise current traffic conditions in the city of San Francisco, Calif. The traffic conditions may indicate that a particular area of the city is experiencing significant traffic congestion, thus roads in the particular area of the city may be denoted by either red color or black color. The social-networking system 560 may pass the received status data to a hotspot-determination module 203. The hotspot-determination module 203 may have a pre-defined algorithm, for example but not limited to, that a particular area may be identified as a hotspot if more than 80% of roads in the particular area are denoted with red or black colors. The hotspot-determination module 203 may determine that the particular area is a hotspot by analyzing the received status data. In particular embodiments, the hotspot-determination module 203 may also utilize any other available data associated with the particular area for the determination. As another example and not by way of limitations, the social-networking system 560 may receive, at step 210, a message comprising status data from a computing device 201A associated with a Los Angeles Police Department (LAPD), the police department responsible for a city of Los Angeles, Calif. The status data may comprise road blockage information in a particular area of the city of Los Angeles due to a traffic accident. An expected traffic speed in the vicinity of the blocked road may be around 15 miles per hour. The social-networking system 560 may pass the received status data to a hotspot-determination module 203. The hotspot-determination module 203 may have a pre-defined algorithm, for example but not limited to, that a particular area may be identified as a hotspot if an expected traffic speed is slower than 20 miles per hour. The hotspot-determination module 203 may determine that the particular area is a hotspot by analyzing the received status data. In particular embodiments, the hotspot-determination module 203 may also utilize any other available data associated with the particular area for the determination. Although this disclosure describes determining hotspots based on received traffic data in a particular manner, this disclosure contemplates determining hotspots based on received traffic data in any suitable manner.

In particular embodiments, the social-networking system 560 may receive a message comprising status data from a computing device 201B associated with a third-party event data provider, where the status data may comprise event data in a particular geographic region. The social-networking system 560 may determine that the particular geographic area is a hotspot if the event data indicates that a mass-gathering event is taking place or is about to take place in the geographic area. In particular embodiments, the social-networking system 560 may determine that the particular geographic area is a hotspot if the event data indicates that a mass-gathering event is taking place and a current status of circumstances relating to the event requires that participants in the mass-gathering event wait for a period of time that is longer than a threshold. As an example and not by way of limitations, the social-networking system 560 may receive a message comprising status data from a computing device 201B associated with a third-party data provider at step 210. The status data may comprise information regarding a Super Bowl game, the championship game of National Football League (NFL), at a stadium in Houston, Tex. The status data may comprise the start time of the game and current crowd gathered around the stadium. The social-networking system 560 may pass the received status data to a hotspot-determination module 203. The hotspot-determination module 203 may determine the area around the stadium is a hotspot because a number of gathered crowd is more than 30,000 people at the moment and the game start time is more than an hour away. While waiting the game time, gathered people may have high probability of accessing a social network application on their mobile computing devices to update their status and upload pictures. In particular embodiments, the hotspot-determination module 203 may also utilize any other available data associated with the particular area for the determination. As another example and not by way of limitations, the social-networking system 560 may receive a message comprising status data from a computing device 201B associated with a third-party data provider at step 210. The status data may comprise information regarding a national convention of a major political party at an indoor arena in Philadelphia, Pa. For a national convention of the political party, delegates and supporters from all around the country gather for a number of days. Participants may update their status on their social network multiple times as the convention progresses. The social-networking system 560 may pass the received status data to a hotspot-determination module 203. The hotspot-determination module 203 may determine the area around the arena is a hotspot based on a number of gathered crowd and the expected length of the event. In particular embodiments, the hotspot-determination module 203 may also utilize any other available data associated with the particular area for the determination. Although this disclosure describes determining hotspots based on received event data in a particular manner, this disclosure contemplates determining hotspots based on received event data in any suitable manner.

In particular embodiments, the social-networking system 560 may receive a message comprising status data from a computing device 201C associated with a third-party data provider, where the status data may comprise waiting queue data. When a person is waiting on a waiting queue, she may not have many other options for entertainment but spending time on her mobile computing device. While spending on the mobile computing device, the user may access a social network application. The social-networking system 560 may determine that the geographic area is a hotspot if the waiting queue data indicates that at least one waiting queue exists in the geographic area and a number of waiting persons in the geographic area exceeds a threshold. In particular embodiments, the social-networking system 560 may determine that the geographic area is a hotspot if the expected time for each of the waiting people exceeds another threshold. As an example and not by way of limitations, the social-networking system 560 may receive a message comprising status data from a computing device 201C associated with a third-party data provider at step 210. The status data may comprise information regarding a waiting line in front of a retail shop of a leading smartphone vendor in New York to buy a newly released smartphone model. The status data may comprise a number of waiting people on the line and an amount of time until the store opening time. The social-networking system 560 may pass the received status data to a hotspot-determination module 203. The hotspot-determination module 203 may determine the area around the retail store is a hotspot because the number of waiting people is more than a first threshold and the amount of time until the store opening time is more than a second threshold. In particular embodiments, the hotspot-determination module 203 may also utilize any other available data associated with the particular area for the determination. As another example and not by way of limitations, the social-networking system 560 may receive a message comprising status data from a computing device 201C associated with a California Department of Motor Vehicles (DMV) at step 210. The status data may comprise a number of waiting people at a DMV office in San Jose, Calif. and an expected average waiting time for each person on the line. The social-networking system 560 may pass the received status data to a hotspot-determination module 203. The hotspot-determination module 203 may determine the area around the DMV office is a hotspot based on the number of waiting people and the expected average waiting time. In particular embodiments, the hotspot-determination module 203 may also utilize any other available data associated with the particular area for the determination. Although this disclosure describes determining hotspots based on received waiting queue data in a particular manner, this disclosure contemplates determining hotspots based on received waiting queue data in any suitable manner.

In particular embodiments, the social-networking system 560 may receive a message comprising status data from a mobile computing device 202A associated with a first user. The status data may comprise a geographic location of the mobile computing device, a speed of the mobile computing device, and an indication whether the mobile computing device is currently being used by the first user. In particular embodiments, the status data may comprise a geographic location of the mobile computing device and a speed of the mobile computing device. In particular embodiments, the status data may comprise a geographic location of the mobile computing device and an indication whether the mobile computing device is currently being used by the first user. On receiving status data from a mobile computing device, the social-networking system 560 may add the received status data into a first database. The social-networking system 560 may determine, based on aggregated data in the first database, that the geographic area is a hotspot if a number of mobile computing devices in the geographic area moving slower than a threshold. In particular embodiments, the social-networking system 560 may determine, based on aggregated data in the first database, that the geographic area is a hotspot if a number of mobile computing devices in the geographic area currently being used by the associated users. In particular embodiments, the social-networking system 560 may determine, based on aggregated data in the first database, that the geographic area is a hotspot if a number of mobile computing devices satisfying one or all of the following conditions exceeds a threshold: (1) the mobile computing devices are located in the geographic area, (2) the mobile computing devices are moving more slowly than a threshold speed, and (3) the mobile computing devices are currently being used by the associated users. As an example and not by way of limitations, the social-networking system 560 may receive a message comprising status data from a mobile computing device 202A that is associated with Bob, an online social network user. The status data may comprise that the mobile computing device 202A is in a particular area of San Francisco, Calif. and the mobile computing device 202A is stationary for 10 minutes, in other words, the mobile computing device 202A has not moved more than a pre-determined range in the last 10 minutes. The social-networking system 560 may add the received status data into a database. The social-networking system 560 may signal a hotspot-determination module 203 to determine whether the particular area is a hotspot. The hotspot-determination module 203 may retrieve an aggregated status data for mobile computing devices in the particular area in San Francisco. The aggregated status data is computed based on status data received during a pre-determined period of time (e.g., last 30 minutes). The hotspot-determination module 203 may determine that the particular area in San Francisco is a hotspot because the aggregated status data indicates that a number of mobile computing devices in the particular area that are moving slower than a threshold is greater than a pre-determined value (e.g., 5,000 mobile computing devices). As another example and not by way of limitations, the social-networking system 560 may receive a message comprising status data from a mobile computing device 202B that is associated with Alice, another online social network user. The status data may comprise that the mobile computing device 202A is in a particular area of a city of New York, N.Y. and the mobile computing device 202A is currently used by a user. The social-networking system 560 may add the received status data into a database. The social-networking system 560 may signal a hotspot-determination module 203 to determine whether the particular area in the city of New York is a hotspot. The hotspot-determination module 203 may retrieve an aggregated status data for mobile computing devices in the particular area in the city of New York. The hotspot-determination module 203 may determine that the particular area in New York is not a hotspot because the aggregated status data indicates that a number of mobile computing devices in the particular area that are being used by associated users is lower than another pre-determined value (e.g., 10,000 mobile computing devices). Although this disclosure describes determining hotspots based on status data received from mobile computing devices in a particular manner, this disclosure contemplates determining hotspots based on status data received from mobile computing devices in any suitable manner.

In particular embodiments, the social-networking system 560 may determine that a geographic area is a hotspot further based on history status data on the geographic area. The history status data may comprise status data per season, month, date, day, or time. As an example and not by way of limitations, the social-networking system 560 may determine a particular area of Los Angeles, Calif. between 4:30-7:00 in the afternoon during weekdays because history data may indicate that the particular area experiences traffic congestion more significant than a threshold between 4:30-7:00 in the afternoon on any weekday. As another example and not by way of limitations, the social-networking system 560 may determine that an area around a home arena of Golden State Warriors, a National Basketball Association (NBA) team, is a hotspot from 2 hours before game time to the end of game on each game day for the team. A history information may indicate that a large number of spectators, more than a threshold, are gathering for the games. As yet another example and not by way of limitations, the social-networking system 560 may determine that an area with restaurants is a hotspot during lunch time because history data indicates that waiting lines for take-out sandwiches are longer than a threshold during lunch time in the particular area. Although this disclosure describes determining hotspots based on history status data in a particular manner, this disclosure contemplates determining hotspots based on history status data in any suitable manner.

In particular embodiments, the social-networking system 560 may send an indication, at step 230, that a geographic area is a hotspot to a third-party computing device 204 when the social-networking system 560 determines that the geographic area is a hotspot. The third-party computing device 204 may determine a value for delivery of content to computing devices associated with the geographic area based on the indication. As an example and not by way of limitations, the social-networking system 560 may determine that a particular geographic area is a hotspot at step 220. The social-networking system 560 may send a message comprising determined hotspot information to a computing device 204 associated with an advertiser at step 230. The computing device 204 associated with the advertiser may calculate an appropriate bid for ads in the particular area based on the hotspot information when the computing device 204 associated with the advertiser places bids on a geo-targeting ad auction 205 at step 240. In many cases, the computing device 204 associated with the advertiser places higher bids for an area determined as a hotspot than for an area not determined as a hotspot. Although this disclosure describes providing hotspot information to a computing device associated with a content provider in a particular manner, this disclosure contemplates providing hotspot information to a computing device associated with a content provider in any suitable manner.

Figure 3:
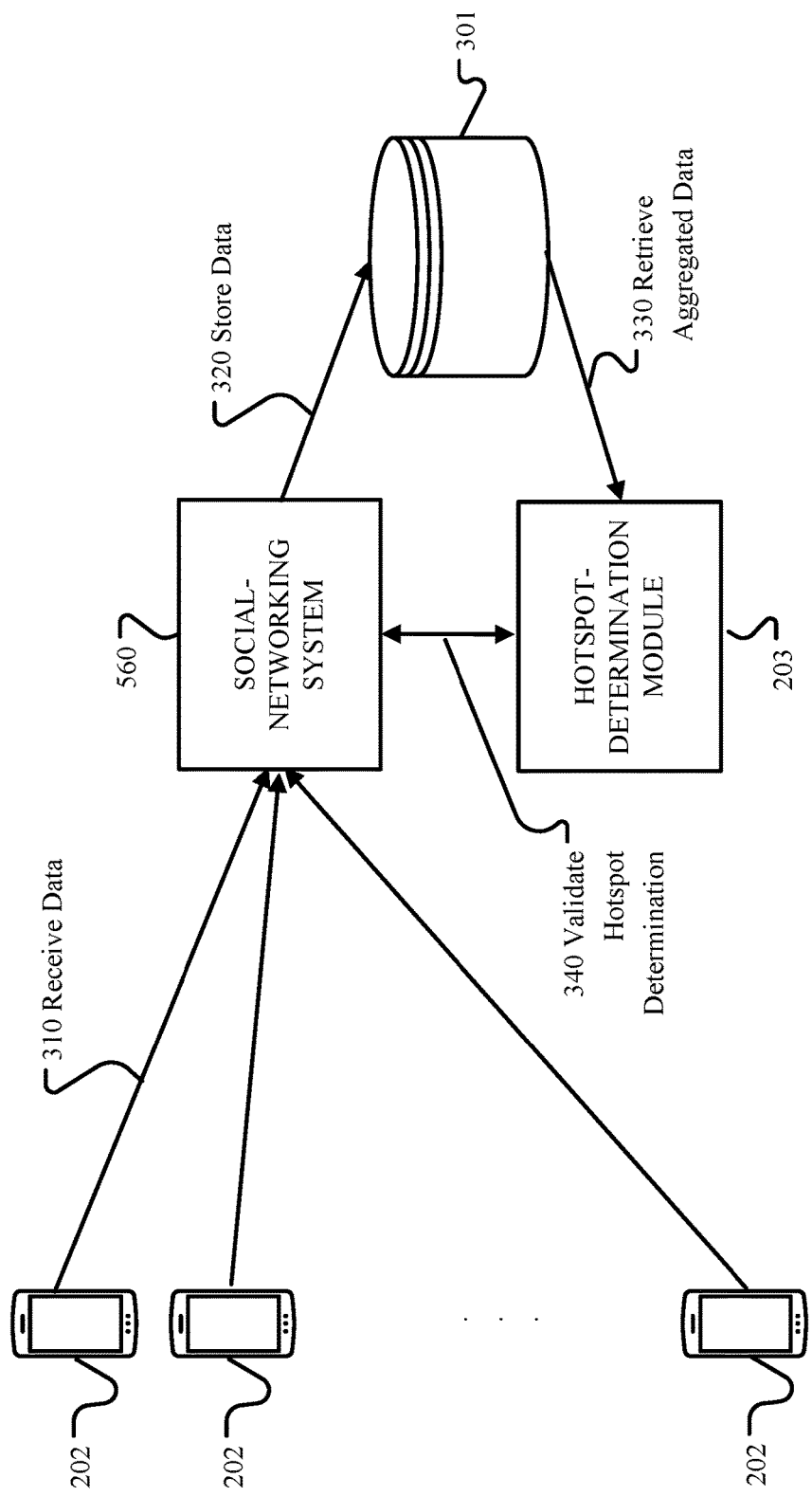
FIG. 3 illustrates example data flows for validating a hotspot.

FIG. 3 illustrates example data flows for verifying a hotspot. In particular embodiments, the social-networking system 560 may validate the determination that a geographic area is a hotspot. Once the social-networking system 560 determines a geographic area is a hotspot, the social-networking system 560 may send a command to mobile computing devices 202 in the geographic area to report status at a regular interval. In particular embodiments, mobile computing devices 202 may be configured to send status data at a regular interval even if the mobile computing devices 202 do not receive a command from the social-networking system 560. On receiving status data from a mobile computing device 202 in a geographic area at step 310, the social-networking system 560 may store, at step 320, the received status data into a database 301. The social-networking system 560 may signal a hotspot-determination module 203 to validate whether the geographic area is a hotspot. The hotspot-determination module 203 may retrieve an aggregated data on the geographic area from the database 301 at step 330. The hotspot-determination module 203 may validate whether the geographic area is a hotspot based on the retrieved aggregated data at step 340. If the validation fails, the social-networking system 560 may send an indication that the geographic area is not a hotspot to the third-party computing device. In particular embodiments, the social-networking system 560 may determine whether the geographic area is a hotspot based on data from mobile computing devices 202. As an example and not by way of limitations, the social-networking system 560 may receive, at step 310, a status data from a mobile computing device 202 in a geographic area. The status data may comprise a measured Click-Through Rate (CTR). The CTR may be measured for a pre-determined period of time (e.g., for the last 30 minutes). The social-networking system 560 may store the received measured CTR into a database 301 at step 320. The social-networking system 560 may signal a hotspot-determination module 203 to validate whether the geographic area is a hotspot. The hotspot-determination module 203 may calculate an average CTR for mobile computing devices in the geographic area based on aggregated data from the database 301 at step 330. The hotspot-determination module 203 may validate the determination that the geographic area is a hotspot if the average CTR is higher than a threshold. The hotspot-determination module 203 may be a part of the social-networking system 560. The social-networking system 560 may determine a geographic area is a hotspot based on the measured CTR received from mobile computing devices in the geographic area. As another example and not by way of limitations, the social-networking system 560 may receive, at step 310, a status data from a mobile computing device 202 in a geographic area. The status data may comprise a measured percentage of time spent on video. The percentage of time spent on video may be measured for a pre-determined period of time (e.g., for the last 30 minutes). The social-networking system 560 may store the received measured percentage of time spent on video into a database 301 at step 320. The social-networking system 560 may signal a hotspot-determination module 203 to validate whether the geographic area is a hotspot. The hotspot-determination module 203 may calculate an average percentage of time spent on video for mobile computing devices in the geographic area based on aggregated data from the database 301 at step 330. The hotspot-determination module 203 may validate the determination that the geographic area is a hotspot if the average percentage of time spent on video is higher than a threshold. The hotspot-determination module 203 may be a part of the social-networking system 560. The social-networking system 560 may determine a geographic area is a hotspot based on the measured percentage of time spent on video received from mobile computing devices in the geographic area. As yet another example and not by way of limitations, the social-networking system 560 may receive, at step 310, a status data from a mobile computing device 202 in a geographic area. The status data may comprise a geographic location of the mobile computing device, a speed of the mobile computing device, and an indication whether the mobile computing device is currently being used by the first user. In particular embodiments, the status data may comprise a geographic location of the mobile computing device and a speed of the mobile computing device. In particular embodiments, the status data may comprise a geographic location of the mobile computing device and an indication whether the mobile computing device is currently being used by the first user. The social-networking system 560 may store the received status data into a database 301 at step 320. The social-networking system 560 may signal a hotspot-determination module 203 to validate whether the geographic area is a hotspot. The hotspot-determination module 203 may determine, based on aggregated data in the database 301, that the geographic area is a hotspot if a number of mobile computing devices in the geographic area moving slower than a threshold. In particular embodiments, the hotspot-determination module 203 may determine, based on aggregated data in the database 301, that the geographic area is a hotspot if a number of mobile computing devices in the geographic area that are currently being used by the associated users. In particular embodiments, the hotspot-determination module 203 may determine, based on aggregated data in the database 301, that the geographic area is a hotspot if a number of mobile computing devices satisfying one or all of the following conditions exceeds a threshold: (1) the mobile computing devices are located in the geographic area, (2) the mobile computing devices are moving more slowly than a threshold speed, and (3) the mobile computing devices are currently being used by the associated users. Although this disclosure describes validating a hotspot based on an aggregated data in a particular manner, this disclosure contemplates validating a hotspot based on an aggregated data in any suitable manner.

In particular embodiments, the social-networking system 560 may select one or more content providers that are relevant to users in a geographic area and send an indication that the geographic area is a hotspot to one or more computing devices associated with the one or more content providers, respectively, when the social-networking system 560 sends the indication that the geographic area is a hotspot. In order to select the one or more content providers, the social-networking system 560 may determine estimated demographic distribution of users in the geographic area based at least on the received status data. As an example and not by way of limitations, the social-networking system 560 may estimate that the majority of users in a geographic area would be office workers if the social-networking system 560 determines the geographic area is a hotspot because of a congestion during a rush hour in a commercial district. As another example and not by way of limitations, the social-networking system 560 may estimate that the majority of users in a geographic area would be young adults (i.e., age range of 18 to 39) if the social-networking system 560 determines the geographic area is a hotspot because of a rock concert. As yet another example and not by way of limitations, the social-networking system 560 may estimate that the majority of users in a geographic area would be teenagers and their parents if the social-networking system 560 determines the geographic area is a hotspot because of a waiting line at a theme park. Although this disclosure describes estimating a demographic distribution of users in a particular manner, this disclosure contemplates estimating a demographic distribution of users in any suitable manner.

In particular embodiments, the social-networking system 560 may estimate a demographic distribution of users based on history data. As an example and not by way of limitations, the social-networking system 560 may determine a geographic area is a hotspot during rush hours on weekdays based on recurring traffic congestions. The social-networking system 560 may estimate that the majority of users in the geographic area would be office workers because the hotspot determination is based on recurring traffic congestion during rush hours. In particular embodiments, the social-networking system 560 may have recorded status data from mobile computing devices 202 during recurring traffic congestions and determine a demographic distribution of users in the geographic area during recurring congestions based on the recorded history data. As another example and not by way of limitations, the social-networking system 560 may determine that a geographic area around a home arena of Golden State Warriors is a hotspot from 2 hours before game time to the end of game on each game day for the team. The social-networking system 560 may estimate that the majority of users in the geographic area would be of age between 20 and 45 because the hotspot determination is based on recurring basketball games. In particular embodiments, the social-networking system 560 may have recorded status data from mobile computing devices 202 during recurring NBA games and determine a demographic distribution of users in the geographic area during recurring events based on the recorded history data. As yet another example and not by way of limitations, the social-networking system 560 may determine that an area with a plurality of take-out restaurants is a hotspot during lunch time because history data indicates that waiting lines for take-out lunch boxes are longer than a threshold during lunch time in the particular area. The social-networking system 560 may estimate that the majority of users in the particular area would be office workers because the hotspot determination is based on recurring lunch lines in a commercial area. In particular embodiments, the social-networking system 560 may have recorded status data from mobile computing devices 202 during recurring lunch time and determine a demographic distribution of users in the particular area during recurring lunch time based on the recorded history data. Although this disclosure describes estimating a demographic distribution of users based on history data in a particular manner, this disclosure contemplates estimating a demographic distribution of users based on history data in any suitable manner.

In particular embodiments, the social-networking system 560 may generate a demographic distribution of users in the geographic area based on records from a database 301. In order to retrieve the demographic distribution of users in the geographic area from the database 301, the social-networking system 560 may receive a message comprising a current geographic location of the mobile computing device 202 from a mobile computing device 202 associated with a user. The social-networking system 560 may store identity information of the associated user and the current geographic location of the mobile computing device 202 into the database 301. The social-networking system 560 may generate a demographic distribution of users in the geographic area based on records from the database 301 based on aggregated data. As an example and not by way of limitations, the social-networking system 560 may receive a message comprising status data from a mobile computing device 202 associated with Alice, an online social network user. The status data may comprise an indication that the mobile computing device is in a particular area of San Francisco, Calif. The social-networking system 560 may retrieve profile information of Alice comprising that Alice is a female in her 30 s, a married software engineer who is interested in cooking and travels. The social-networking system 560 may temporarily store a record with the profile of Alice and the current location of her in a temporary database 301. When the social-networking system 560 determines a demographic distribution of users in the particular area because the particular area is determined to be a hotspot, the social-networking system 560 may access the record of Alice in the database and aggregate the record with records of the other users in the particular area to produce a demographic distribution of users in the particular area. Although this disclosure describes generating a demographic distribution of users by aggregating records in a particular manner, this disclosure contemplates generating a demographic distribution of users by aggregating records in any suitable manner.

In particular embodiments, the social-networking system 560 may identify types of content that have a higher probability of eliciting action from users in the geographic area than other types of content based on the estimated demographic distribution of users. To identify types of content that have a higher probability of eliciting action from users in the geographic area than other types of content based on the estimated demographic distribution of users, the social-networking system 560 may rank the types of content in order of respective probability of eliciting action from users in the geographic area based on the estimated demographic distribution of users. The social-networking system 560 may identify the k highest rank types of content, where k is a pre-determined number. The social-networking system 560 may select one or more content providers that provide the identified types of content. As an example and not by way of limitations, the social-networking system 560 may rank a video game advertisement high because the social-networking system 560 estimated that the majority of users in the hotspot are male teenagers. The social-networking system 560 may select advertisers 204 that have video game ads when the social-networking system 560 selects target advertisers to send hotspot information. As another example and not by way of limitations, the social-networking system 560 may rank cosmetics advertisement high because the social-networking system 560 estimates that the majority of users in the hotspot is female in age between 20-45. The social-networking system 560 may select advertisers 204 that have cosmetics ads when the social-networking system 560 selects target advertisers 204 to send hotspot information. Although this disclosure describes identifying types of content that have a higher probability of eliciting action from users in a geographic area in a particular manner, this disclosure contemplates identifying types of content that have a higher probability of eliciting action from users in a geographic area in any suitable manner.

Figure 4:
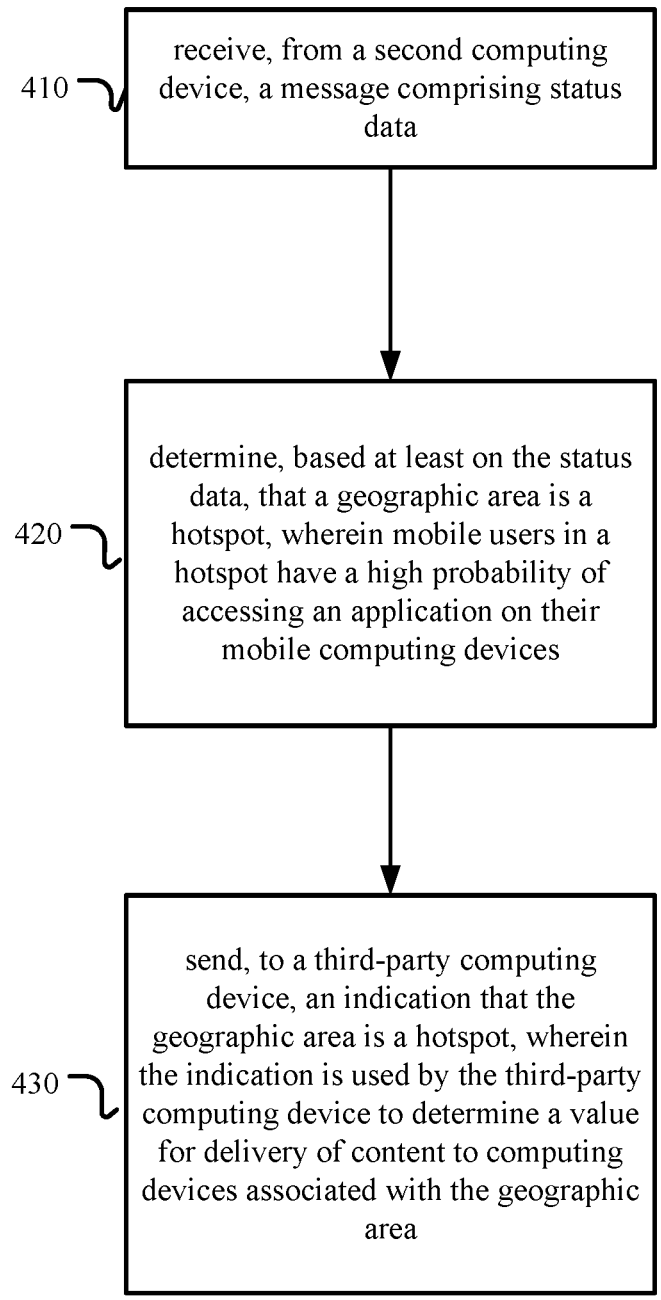
FIG. 4 illustrates an example method for providing a hotspot indication to a content provider based on status data.

FIG. 4 illustrates an example method 400 for providing a hotspot indication to a content provider based on status data. The method may begin at step 410, where the social-networking system 560 may receive, from a second computing device, a message comprising status data. At step 420, the social-networking system 560 may determine, based at least on the status data, that a geographic area is a hotspot, wherein mobile users in a hotspot have a high probability of accessing an application on their mobile computing devices. At step 430, the social-networking system 560 may send, to a third-party computing device, an indication that the geographic area is a hotspot, wherein the indication is used by the third-party computing device to determine a value for delivery of content to computing devices associated with the geographic area. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for providing a hotspot indication to a content provider based on status data including the particular steps of the method of FIG. 4, this disclosure contemplates any suitable method for providing a hotspot indication to a content provider based on status data including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

System Overview

Figure 5:
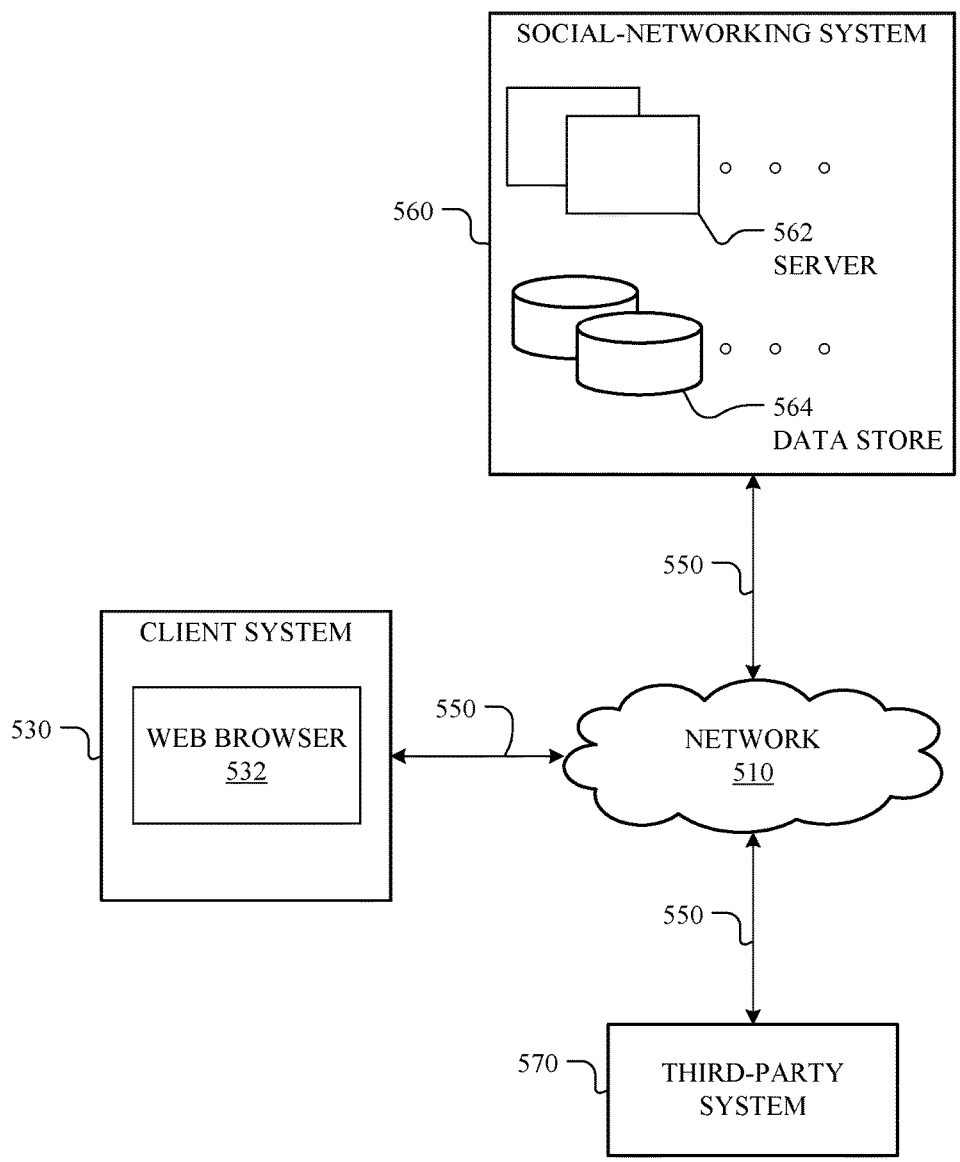
FIG. 5 illustrates an example network environment associated with a social-networking system.

FIG. 5 illustrates an example network environment 500 associated with a social-networking system. Network environment 500 includes a client system 530, a social-networking system 560, and a third-party system 570 connected to each other by a network 510. Although FIG. 5 illustrates a particular arrangement of client system 530, social-networking system 560, third-party system 570, and network 510, this disclosure contemplates any suitable arrangement of client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of client systems 530, social-networking systems 560, third-party systems 570, and networks 510, this disclosure contemplates any suitable number of client systems 530, social-networking systems 560, third-party systems 570, and networks 510. As an example and not by way of limitation, network environment 500 may include multiple client system 530, social-networking systems 560, third-party systems 570, and networks 510.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

In particular embodiments, client system 530 may be an electronic device including hardware, software, or embedded logic components or a combination of two or more such components and capable of carrying out the appropriate functionalities implemented or supported by client system 530. As an example and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 530. A client system 530 may enable a network user at client system 530 to access network 510. A client system 530 may enable its user to communicate with other users at other client systems 530.

In particular embodiments, client system 530 may include a web browser 532, such as MICROSOFT INTERNET EXPLORER, GOOGLE CHROME or MOZILLA FIRE-FOX, and may have one or more add-ons, plug-ins, or other extensions, such as TOOLBAR or YAHOO TOOLBAR. A user at client system 530 may enter a Uniform Resource Locator (URL) or other address directing the web browser 532 to a particular server (such as server 562, or a server associated with a third-party system 570), and the web browser 532 may generate a Hyper Text Transfer Protocol (HTTP) request and communicate the HTTP request to server. The server may accept the HTTP request and communicate to client system 530 one or more Hyper Text Markup Language (HTML) files responsive to the HTTP request. Client system 530 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 560 may be a network-addressable computing system that can host an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. As an example and not by way of limitation, client system 530 may access social-networking system 560 using a web browser 532, or a native application associated with social-networking system 560 (e.g., a mobile social-networking application, a messaging application, another suitable application, or any combination thereof) either directly or via network 510. In particular embodiments, social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, social-networking system 560 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client system 530, a social-networking system 560, or a third-party system 570 to manage, retrieve, modify, add, or delete, the information stored in data store 564.

In particular embodiments, social-networking system 560 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. Social-networking system 560 may provide users of the online social network the ability to communicate and interact with other users. In particular embodiments, users may join the online social network via social-networking system 560 and then add connections (e.g., relationships) to a number of other users of social-networking system 560 to whom they want to be connected. Herein, the term "friend" may refer to any other user of social-networking system 560 with whom a user has formed a connection, association, or relationship via social-networking system 560.

In particular embodiments, social-networking system 560 may provide users with the ability to take actions on various types of items or objects, supported by social-networking system 560. As an example and not by way of limitation, the items and objects may include groups or social networks to which users of social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 560 or by an external system of third-party system 570, which is separate from social-networking system 560 and coupled to social-networking system 560 via a network 510.

In particular embodiments, social-networking system 560 may be capable of linking a variety of entities. As an example and not by way of limitation, social-networking system 560 may enable users to interact with each other as well as receive content from third-party systems 570 or other entities, or to allow users to interact with these entities through an application programming interfaces (API) or other communication channels.

In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating social-networking system 560. In particular embodiments, however, social-networking system 560 and third-party systems 570 may operate in conjunction with each other to provide social-networking services to users of social-networking system 560 or third-party systems 570. In this sense, social-networking system 560 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 560 also includes user-generated content objects, which may enhance a user's interactions with social-networking system 560. User-generated content may include anything a user can add, upload, send, or "post" to social-networking system 560. As an example and not by way of limitation, a user communicates posts to social-networking system 560 from a client system 530. Posts may include data such as status updates or other textual data, location information, photos, videos, links, music or other similar data or media. Content may also be added to social-networking system 560 by a third-party through a "communication channel," such as a newsfeed or stream.

In particular embodiments, social-networking system 560 may include a variety of servers, sub-systems, programs, modules, logs, and data stores. In particular embodiments, social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 560 may also include suitable components such as network interfaces, security mechanisms, load balancers, failover servers, management-and-network-operations consoles, other suitable components, or any suitable combination thereof. In particular embodiments, social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 560 to one or more client systems 530 or one or more third-party system 570 via network 510. The web server may include a mail server or other messaging functionality for receiving and routing messages between social-networking system 560 and one or more client systems 530. An API-request server may allow a third-party system 570 to access information from social-networking system 560 by calling one or more APIs. An action logger may be used to receive communications from a web server about a user's actions on or off social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from client system 530 responsive to a request received from client system 530. Authorization servers may be used to enforce one or more privacy settings of the users of social-networking system 560. A privacy setting of a user determines how particular information associated with a user can be shared. The authorization server may allow users to opt in to or opt out of having their actions logged by social-networking system 560 or shared with other systems (e.g., third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Social Graphs

Figure 6:
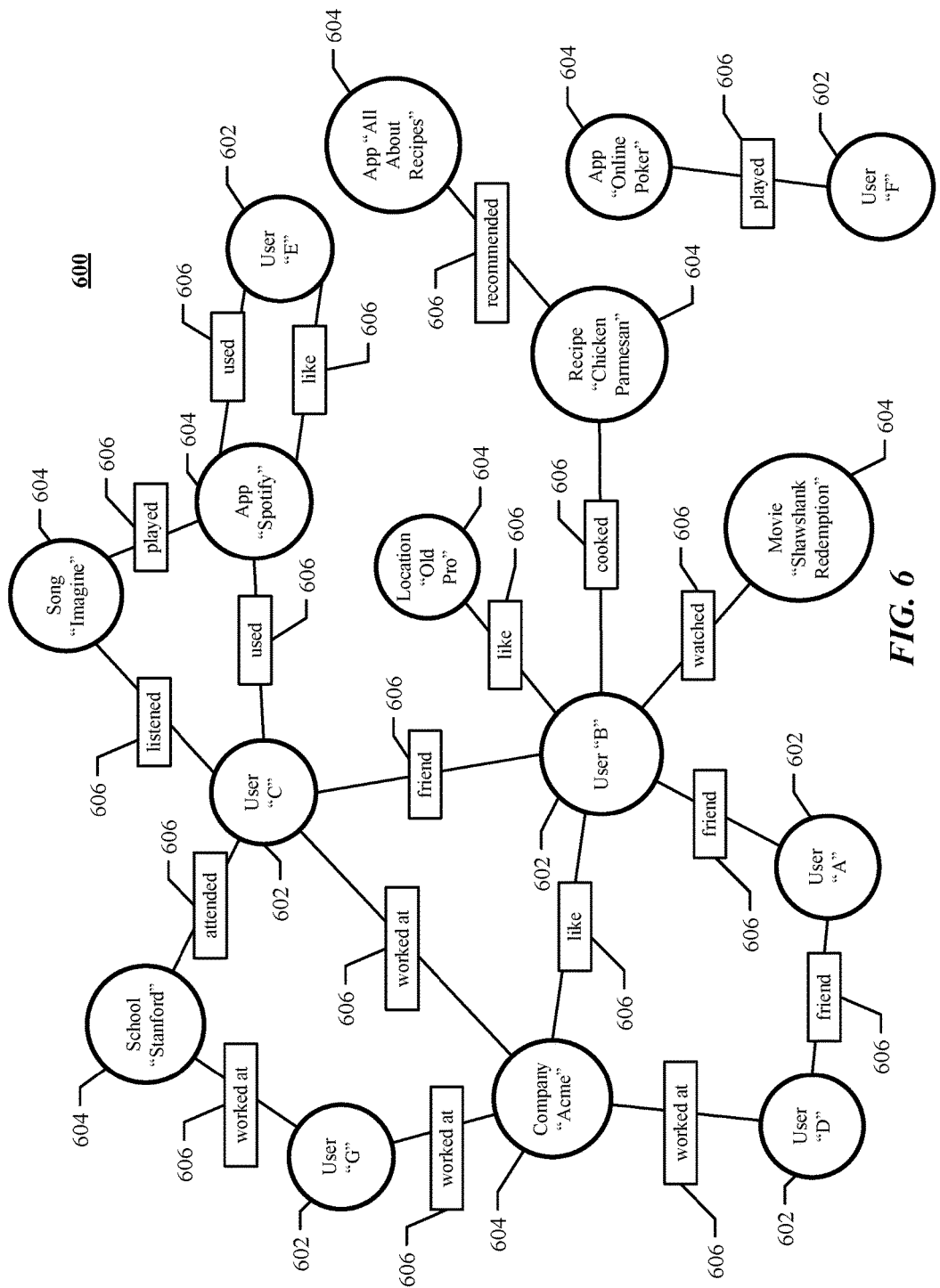
FIG. 6 illustrates an example social graph.

FIG. 6 illustrates example social graph 600. In particular embodiments, social-networking system 560 may store one or more social graphs 600 in one or more data stores. In particular embodiments, social graph 600 may include multiple nodes—which may include multiple user nodes 602 or multiple concept nodes 604—and multiple edges 606 connecting the nodes. Example social graph 600 illustrated in FIG. 6 is shown, for didactic purposes, in a two-dimensional visual map representation. In particular embodiments, a social-networking system 560, client system 530, or third-party system 570 may access social graph 600 and related social-graph information for suitable applications. The nodes and edges of social graph 600 may be stored as data objects, for example, in a data store (such as a social-graph database). Such a data store may include one or more searchable or queryable indexes of nodes or edges of social graph 600.

In particular embodiments, a user node 602 may correspond to a user of social-networking system 560. As an example and not by way of limitation, a user may be an individual (human user), an entity (e.g., an enterprise, business, or third-party application), or a group (e.g., of individuals or entities) that interacts or communicates with or over social-networking system 560. In particular embodiments, when a user registers for an account with social-networking system 560, social-networking system 560 may create a user node 602 corresponding to the user, and store the user node 602 in one or more data stores. Users and user nodes 602 described herein may, where appropriate, refer to registered users and user nodes 602 associated with registered users. In addition or as an alternative, users and user nodes 602 described herein may, where appropriate, refer to users that have not registered with social-networking system 560. In particular embodiments, a user node 602 may be associated with information provided by a user or information gathered by various systems, including social-networking system 560. As an example and not by way of limitation, a user may provide his or her name, profile picture, contact information, birth date, sex, marital status, family status, employment, education background, preferences, interests, or other demographic information. In particular embodiments, a user node 602 may be associated with one or more data objects corresponding to information associated with a user. In particular embodiments, a user node 602 may correspond to one or more webpages.

In particular embodiments, a concept node 604 may correspond to a concept. As an example and not by way of limitation, a concept may correspond to a place (such as, for example, a movie theater, restaurant, landmark, or city); a website (such as, for example, a website associated with social-network system 560 or a third-party website associated with a web-application server); an entity (such as, for example, a person, business, group, sports team, or celebrity); a resource (such as, for example, an audio file, video file, digital photo, text file, structured document, or application) which may be located within social-networking system 560 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 604 may be associated with information of a concept provided by a user or information gathered by various systems, including social-networking system 560. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 604 may be associated with one or more data objects corresponding to information associated with concept node 604. In particular embodiments, a concept node 604 may correspond to one or more webpages.

In particular embodiments, a node in social graph 600 may represent or be represented by a webpage (which may be referred to as a "profile page"). Profile pages may be hosted by or accessible to social-networking system 560. Profile pages may also be hosted on third-party websites associated with a third-party system 570. As an example and not by way of limitation, a profile page corresponding to a particular external webpage may be the particular external webpage and the profile page may correspond to a particular concept node 604. Profile pages may be viewable by all or a selected subset of other users. As an example and not by way of limitation, a user node 602 may have a corresponding user-profile page in which the corresponding user may add content, make declarations, or otherwise express himself or herself. As another example and not by way of limitation, a concept node 604 may have a corresponding concept-profile page in which one or more users may add content, make declarations, or express themselves, particularly in relation to the concept corresponding to concept node 604.

In particular embodiments, a concept node 604 may represent a third-party webpage or resource hosted by a third-party system 570. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 530 to send to social-networking system 560 a message indicating the user's action. In response to the message, social-networking system 560 may create an edge (e.g., a check-in-type edge) between a user node 602 corresponding to the user and a concept node 604 corresponding to the third-party webpage or resource and store edge 606 in one or more data stores.

In particular embodiments, a pair of nodes in social graph 600 may be connected to each other by one or more edges 606. An edge 606 connecting a pair of nodes may represent a relationship between the pair of nodes. In particular embodiments, an edge 606 may include or represent one or more data objects or attributes corresponding to the relationship between a pair of nodes. As an example and not by way of limitation, a first user may indicate that a second user is a "friend" of the first user. In response to this indication, social-networking system 560 may send a "friend request" to the second user. If the second user confirms the "friend request," social-networking system 560 may create an edge 606 connecting the first user's user node 602 to the second user's user node 602 in social graph 600 and store edge 606 as social-graph information in one or more of data stores 564. In the example of FIG. 6, social graph 600 includes an edge 606 indicating a friend relation between user nodes 602 of user "A" and user "B" and an edge indicating a friend relation between user nodes 602 of user "C" and user "B." Although this disclosure describes or illustrates particular edges 606 with particular attributes connecting particular user nodes 602, this disclosure contemplates any suitable edges 606 with any suitable attributes connecting user nodes 602. As an example and not by way of limitation, an edge 606 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 600 by one or more edges 606.

In particular embodiments, an edge 606 between a user node 602 and a concept node 604 may represent a particular action or activity performed by a user associated with user node 602 toward a concept associated with a concept node 604. As an example and not by way of limitation, as illustrated in FIG. 6, a user may "like," "attended," "played," "listened," "cooked," "worked at," or "watched" a concept, each of which may correspond to an edge type or subtype. A concept-profile page corresponding to a concept node 604 may include, for example, a selectable "check in" icon (such as, for example, a clickable "check in" icon) or a selectable "add to favorites" icon. Similarly, after a user clicks these icons, social-networking system 560 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 560 may create a "listened" edge 606 and a "used" edge (as illustrated in FIG. 6) between user nodes 602 corresponding to the user and concept nodes 604 corresponding to the song and application to indicate that the user listened to the song and used the application. Moreover, social-networking system 560 may create a "played" edge 606 (as illustrated in FIG. 6) between concept nodes 604 corresponding to the song and the application to indicate that the particular song was played by the particular application. In this case, "played" edge 606 corresponds to an action performed by an external application (SPOTIFY) on an external audio file (the song "Imagine"). Although this disclosure describes particular edges 606 with particular attributes connecting user nodes 602 and concept nodes 604, this disclosure contemplates any suitable edges 606 with any suitable attributes connecting user nodes 602 and concept nodes 604. Moreover, although this disclosure describes edges between a user node 602 and a concept node 604 representing a single relationship, this disclosure contemplates edges between a user node 602 and a concept node 604 representing one or more relationships. As an example and not by way of limitation, an edge 606 may represent both that a user likes and has used at a particular concept. Alternatively, another edge 606 may represent each type of relationship (or multiples of a single relationship) between a user node 602 and a concept node 604 (as illustrated in FIG. 6 between user node 602 for user "E" and concept node 604 for "SPOTIFY").

In particular embodiments, social-networking system 560 may create an edge 606 between a user node 602 and a concept node 604 in social graph 600. As an example and not by way of limitation, a user viewing a concept-profile page (such as, for example, by using a web browser or a special-purpose application hosted by the user's client system 530) may indicate that he or she likes the concept represented by the concept node 604 by clicking or selecting a "Like" icon, which may cause the user's client system 530 to send to social-networking system 560 a message indicating the user's liking of the concept associated with the concept-profile page. In response to the message, social-networking system 560 may create an edge 606 between user node 602 associated with the user and concept node 604, as illustrated by "like" edge 606 between the user and concept node 604. In particular embodiments, social-networking system 560 may store an edge 606 in one or more data stores. In particular embodiments, an edge 606 may be automatically formed by social-networking system 560 in response to a particular user action. As an example and not by way of limitation, if a first user uploads a picture, watches a movie, or listens to a song, an edge 606 may be formed between user node 602 corresponding to the first user and concept nodes 604 corresponding to those concepts. Although this disclosure describes forming particular edges 606 in particular manners, this disclosure contemplates forming any suitable edges 606 in any suitable manner.

Advertising

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 560). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 560. In addition or as an alternative, the social action may be promoted outside or off of social-networking system 560, where appropriate. In particular embodiments, a page may be an on-line presence (such as a webpage or website within or outside of social-networking system 560) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 560. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044, 506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 560) or RSVP (e.g., through social-networking system 560) to an event associated with the advertisement. In addition or as an alternative, an advertisement may include social-networking-system content directed to the user. For example, an advertisement may display information about a friend of the user within social-networking system 560 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 560 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 560.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 560 to identify those users. In addition or as an alternative, social-networking system 560 may use user-profile information in social-networking system 560 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 560, off or outside of social-networking system 560, or on mobile computing devices of users. When on or within social-networking system 560, such targeting may be directed to users' news feeds, search results, e-mail or other in-boxes, or notifications channels or may appear in particular area of web pages of social-networking system 560, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 560, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 560 or explicit connections of a user to a node, object, entity, brand, or page on social-networking system 560. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering.

Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

Social Graph Affinity and Coefficient

In particular embodiments, social-networking system 560 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 570 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 560 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 560 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 560 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 560 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 560 may calculate a coefficient based on a user's actions. Social-networking system 560 may monitor such actions on the online social network, on a third-party system 570, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 560 may calculate a coefficient based on the user's actions with particular types of content. The content may be associated with the online social network, a third-party system 570, or another suitable system. The content may include users, profile pages, posts, news stories, headlines, instant messages, chat room conversations, emails, advertisements, pictures, video, music, other suitable objects, or any combination thereof. Social-networking system 560 may analyze a user's actions to determine whether one or more of the actions indicate an affinity for subject matter, content, other users, and so forth. As an example and not by way of limitation, if a user frequently posts content related to "coffee" or variants thereof, social-networking system 560 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 560 may calculate a coefficient based on the type of relationship between particular objects. Referencing the social graph 600, social-networking system 560 may analyze the number and/or type of edges 606 connecting particular user nodes 602 and concept nodes 604 when calculating a coefficient. As an example and not by way of limitation, user nodes 602 that are connected by a spouse-type edge (representing that the two users are married) may be assigned a higher coefficient than a user nodes 602 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 560 may determine that the user has a higher coefficient with respect to the first photo than the second photo because having a tagged-in-type relationship with content may be assigned a higher weight and/or rating than having a like-type relationship with content. In particular embodiments, social-networking system 560 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 560 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 600. As an example and not by way of limitation, social-graph entities that are closer in the social graph 600 (i.e., fewer degrees of separation) may have a higher coefficient than entities that are further apart in the social graph 600.

In particular embodiments, social-networking system 560 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 530 of the user). A first user may be more interested in other users or concepts that are closer to the first user. As an example and not by way of limitation, if a user is one mile from an airport and two miles from a gas station, social-networking system 560 may determine that the user has a higher coefficient for the airport than the gas station based on the proximity of the airport to the user.

In particular embodiments, social-networking system 560 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 560 may provide information that is relevant to user's interests and current circumstances, increasing the likelihood that they will find such information of interest. In particular embodiments, social-networking system 560 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 560 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 560 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 570 (e.g., via an API or other communication channel), or from another suitable system. In response to the request, social-networking system 560 may calculate the coefficient (or access the coefficient information if it has previously been calculated and stored). In particular embodiments, social-networking system 560 may measure an affinity with respect to a particular process. Different processes (both internal and external to the online social network) may request a coefficient for a particular object or set of objects. Social-networking system 560 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 7:
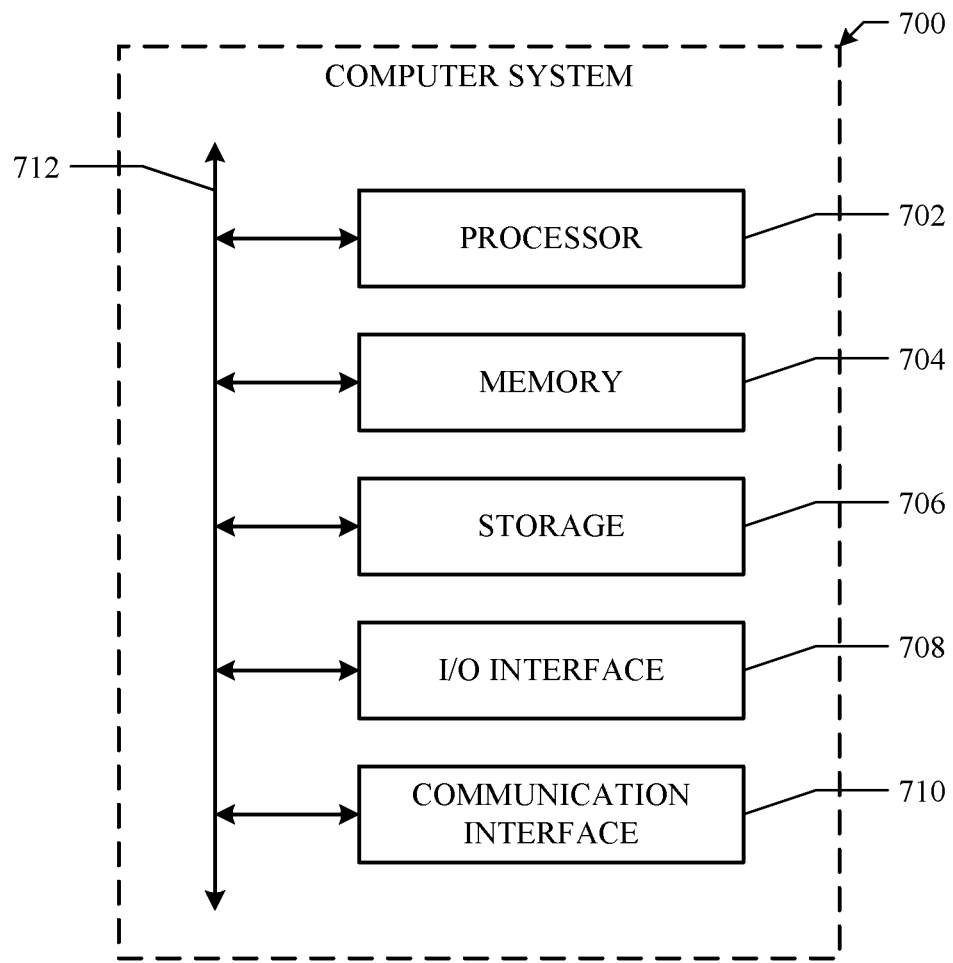
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As an example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a first computing device, receiving, from a second computing device, a message comprising status data;
   by the first computing device, determining, based at least on the status data, that a geographic area is a hotspot, wherein mobile users in a hotspot have a high probability of accessing an application on their mobile computing devices;
   by the first computing device, sending, to a third-party computing device, an indication that the geographic area is a hotspot, wherein the indication is used by the third-party computing device to determine a value for delivery of content to computing devices associated with the geographic area;
   validating the determination that the geographic area is a hotspot; and
   sending, to the third-party computing device, an indication that the geographic area is not a hotspot if the validation fails.

2. The method of claim 1, wherein the second computing device is associated with a third-party data provider.

3. The method of claim 2, wherein the status data comprises traffic data, wherein the geographic area is determined to be a hotspot if the traffic data indicates that traffic congestion in the geographic area is higher than a threshold.

4. The method of claim 2, wherein the status data comprises event data, wherein the geographic area is determined to be a hotspot if the event data indicates that a mass-gathering event is taking place or will soon take place in the geographic area and a current status of circumstances relating to the event requires that participants in the mass-gathering event wait for a period of time that is longer than a threshold.

5. The method of claim 2, wherein the status data comprises waiting queue data, wherein the geographic area is determined to be a hotspot if the waiting queue data indicates that at least one waiting queue exists in the geographic area and a number of waiting persons in the at least one waiting queue exceeds a threshold.

6. The method of claim 1, wherein the second computing device is a mobile computing device associated with a first user.

7. The method of claim 6, wherein the status data comprises a geographic location of the mobile computing device, a speed of the mobile computing device, or an indication that the mobile computing device is currently being used by the first user.

8. The method of claim 7, wherein the geographic area is determined to be a hotspot by:
   adding the received status data into a first database; and
   determining, based on gathered data in the first database, the geographic area is a hotspot if a number of mobile computing devices satisfying the following conditions exceeds a threshold:
      the mobile computing devices are located in the geographic area;
      the mobile computing devices are moving more slowly than a threshold speed; and the mobile computing devices are currently being used by the associated users.

9. The method of claim 1, wherein a geographic area is determined to be a hotspot further based on history status data on the geographic area, wherein the history status data comprises status data per season, month, date, day, or time.

10. The method of claim 1, wherein the validating the determination comprises:
receiving, from a mobile computing device in the geographic area, a measurement report, wherein the measurement report comprises a measured Click-Through Rate (CTR);
adding the received measured CTR into a second database;
calculating an average CTR for mobile computing devices in the geographic area; and
validating the determination that the geographic area is a hotspot if the average CTR is higher than a threshold.

11. The method of claim 1, wherein the validating the determination comprises:
receiving, from a mobile computing device in the geographic area, a measurement report, wherein the measurement report comprises a measured percentage of time spent on video;
adding the received measured percentage of time spent on video into a second database;
calculating an average percentage of time spent on video for mobile computing devices in the geographic area; and
validating the determination that the geographic area is a hotspot if the average percentage of time spent on video is higher than a threshold.

12. The method of claim 1, wherein the validating the determination comprises:
receiving, from a mobile computing device associated with a second user, a message comprising status data, wherein the status data comprises a geographic location of the mobile computing device, a speed of the mobile computing device, or an indication that the mobile computing device is currently being used by the second user;
adding the received status data into a first database; and
verifying, based on gathered data in the first database, the determination that the geographic area is a hotspot if a number of mobile computing devices satisfying the following conditions exceeds a threshold:
the mobile computing devices are located in the geographic area;
the mobile computing devices are moving more slowly than a threshold speed; and
the mobile computing devices are currently being used by the associated users.

13. The method of claim 1, wherein the sending the indication that the geographic area is a hotspot comprises:
selecting one or more content providers that are relevant to users in the geographic area; and
sending, to one or more computing devices associated with the one or more content providers, respectively, the indication that the geographic area is a hotspot.

14. The method of claim 13, wherein the selecting the one or more content providers comprises:
determining estimated demographic distribution of users in the geographic area based at least on the received status data;
identifying types of content that have a higher probability of eliciting action from users in the geographic area than other types of content based on the estimated demographic distribution of users; and
selecting one or more content providers that provide the identified types of content.

15. The method of claim 14, wherein the demographic distribution of users is estimated based on history data.

16. The method of claim 14, wherein the identifying types of content comprises:
ranking the types of content in order of respective probability of eliciting action from users in the geographic area based on the estimated demographic distribution of users; and
identifying the k highest rank types of content, wherein k is a pre-determined number.

17. The method of claim 14, wherein the determining estimated demographic distribution of users in the geographic area comprises:
receiving, from a mobile computing device associated with a third user, a message comprising a current geographic location of the mobile computing device;
storing identity information of the third user and the current geographic location into a third database; and
retrieving demographic distribution of users in the geographic area from the third database.

18. One or more computer-readable non-transitory storage media embodying software that is operable when executed to:
receive, from a second computing device, a message comprising status data;
determine, based at least on the status data, that a geographic area is a hotspot, wherein mobile users in a hotspot have a high probability of accessing an application on their mobile computing devices;
send, to a third-party computing device, an indication that the geographic area is a hotspot, wherein the indication is used by the third-party computing device to determine a value for delivery of content to computing devices associated with the geographic area;
validate the determination that the geographic area is a hotspot; and
send, to the third-party computing device, an indication that the geographic area is not a hotspot if the validation fails.

19. A system comprising: one or more processors; and a non-transitory memory coupled to the processors comprising instructions executable by the processors, the processors operable when executing the instructions to:
receive, from a second computing device, a message comprising status data;
determine, based at least on the status data, that a geographic area is a hotspot, wherein mobile users in a hotspot have a high probability of accessing an application on their mobile computing devices; and
send, to a third-party computing device, an indication that the geographic area is a hotspot, wherein the indication is used by the third-party computing device to determine a value for delivery of content to computing devices associated with the geographic area;
validate the determination that the geographic area is a hotspot; and
send, to the third-party computing device, an indication that the geographic area is not a hotspot if the validation fails.

* * * * *